(12) United States Patent
Almy et al.

(10) Patent No.: US 10,148,220 B2
(45) Date of Patent: Dec. 4, 2018

(54) RATCHETING STOW MECHANISM FOR SOLAR TRACKING PHOTOVOLTAIC PANEL MOUNTING SYSTEM

(71) Applicant: SolarCity Corporation, San Mateo, CA (US)

(72) Inventors: Charles Almy, Berkeley, CA (US); Soren Jensen, Corte Madera, CA (US); Kathryn A. Pesce, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 167 days.

(21) Appl. No.: 14/961,800

(22) Filed: Dec. 7, 2015

(65) Prior Publication Data
US 2017/0163208 A1    Jun. 8, 2017

(51) Int. Cl.
*H02S 20/30* (2014.01)
*H02S 20/32* (2014.01)
*F24S 30/425* (2018.01)
*F24S 40/80* (2018.01)

(52) U.S. Cl.
CPC ............ *H02S 20/32* (2014.12); *F24S 30/425* (2018.05); *F24S 40/85* (2018.05); *H02S 20/30* (2014.12); *Y02E 10/47* (2013.01); *Y02E 10/50* (2013.01)

(58) Field of Classification Search
CPC .......... H02S 20/00; H02S 20/10; H02S 20/30; H02S 20/32; F24J 2/38; Y02E 10/50; Y02E 10/47; F24S 30/425; F24S 40/85
USPC ............... 126/573, 576, 577, 600, 605, 606; 136/246, 251, 259
See application file for complete search history.

(56) References Cited

U.S. PATENT DOCUMENTS

| 3,620,846 | A | 11/1971 | Paine et al. |
|---|---|---|---|
| 4,108,154 | A | 8/1978 | Nelson |
| 4,211,212 | A | 7/1980 | Braun |
| 4,424,802 | A | 1/1984 | Winders |

(Continued)

FOREIGN PATENT DOCUMENTS

| CN | 2067809 U | 12/1990 |
|---|---|---|
| CN | 2240128 Y | 11/1996 |

(Continued)

OTHER PUBLICATIONS

English machine translation of JP 2002-252365A.*

(Continued)

*Primary Examiner* — Lindsey A Bernier
(74) *Attorney, Agent, or Firm* — Kilpatrick Townsend & Stockton LLP (57) ABSTRACT

Photovoltaic tracking systems with a ratcheting stow mechanism are provided. In particular, tracking systems allow for controlled movement of photovoltaic panels adapted for solar tracking to a stowed configuration without requiring electrical power. Such mounting systems can include a partially toothed ring gear with a pair of pawls pivotally mounted adjacent the ring gear with a pair of solenoids that when de-energized, move the pawls into engagement with the ring gear such that ratcheting movement of the pair of pawls along the ring gear in response to back-and-forth oscillating movement of the panel incrementally moves the panels into a stowed configuration without requiring use of electrical power.

20 Claims, 7 Drawing Sheets

(56) References Cited

U.S. PATENT DOCUMENTS

| | | |
|---|---|---|
| 8,593,102 B2 | 11/2013 | McGuire et al. |
| 2007/0062195 A1* | 3/2007 | Walpita .................. F03G 6/068 60/641.15 |
| 2011/0041834 A1* | 2/2011 | Liao ........................ F24J 2/542 126/605 |

FOREIGN PATENT DOCUMENTS

| | | |
|---|---|---|
| CN | 101126553 A | 2/2008 |
| CN | 201740252 U | 2/2011 |
| CN | 101832652 B | 10/2011 |
| CN | 104950911 A | 9/2015 |
| JP | 2002252365 A * | 9/2002 .............. F24J 2/085 |
| KR | 20110050799 A | 5/2011 |
| KR | 101119140 B1 | 3/2012 |
| KR | 101381110 B1 | 4/2014 |
| WO | 2012167776 A2 | 12/2012 |

OTHER PUBLICATIONS

Piquant, Jen-Luc, From the Archives: in perpetuity, Cocktail Party Physics website, May 11, 2010, retrieved at: http://twistedphysics.typepad.com/cocktail_party_physics/2010/05/in_perpetuity.html, 5 pages.

* cited by examiner

RATCHETING STOW MECHANISM FOR SOLAR TRACKING PHOTOVOLTAIC PANEL MOUNTING SYSTEM

FIELD OF THE INVENTION

The invention relates to photovoltaic energy generation mounting and tracking systems and more specifically to systems and methods for controlling movement of mounted photovoltaic panels.

BACKGROUND

Although total market penetration of solar into the relevant base of potential customers remains relatively low in the United States, residential and commercial solar installs have enjoyed double digit growth since the mid to late 2000s. Despite this recent success, developments to reduce cost, increase efficiency and improve overall home integration are ongoing and must continue to increase solar's relatively meager market share when compared to grid-based utility power.

To further improve the efficiency of solar panels, mounting systems have been developed that allow for movement of solar panels to maximize sun exposure. Such systems have utilized various means to effect movement of solar panels to track movement of the sun. Such systems, however, may periodically leave the solar panels in a less than ideal configuration, particularly when power is cut-off as may happen in inclement weather. Such configurations may leave the solar panels vulnerable to damage from high winds that frequently occur during inclement weather.

To deal with this problem, some systems have utilized power backup systems that utilize stored energy or require manual intervention to move the solar panels to a safely stowed configuration—typically at zero degrees of inclination (i.e., parallel to the ground). Such systems, however, increase the size, complexity and cost of such systems or require human intervention. Therefore, there exists a need for photovoltaic mounting systems that provide robust and reliable movement control to allow moveable solar panels to be safely stowed in the event that power is lost.

BRIEF SUMMARY

In one aspect, the invention provides a mounting and solar tracking system having a ratcheting stow mechanism that allows for controlled movement of the photovoltaic panels to a stowed configuration without requiring use of electrical power. Such systems can include a partially toothed ring gear engageable with one or more pawls when a solenoid attached to the one or more pawls is de-energized upon loss of power. The ring gear and pawl(s) are configured such that, when engaged, oscillating back-and-forth movement of the photovoltaic panel incrementally moves the panel towards a stowed position in which the panel remains secured by the one or more pawls until power is restored.

In various embodiments, the photovoltaic mounting system includes a partially toothed ring gear and one or more pawls disposed adjacent the ring gear, each pawl being coupled to a solenoid. The pawl is pivotally coupled and attached to the solenoid such that when the solenoid is de-energized, the solenoid moves the one or more pawls into engagement with the ring gear. The partially toothed ring gear is operably coupleable with a torque tube adapted for supporting and moving a photovoltaic panel for solar tracking by motor-driven rotation of the torque tube for solar tracking. The ring gear includes a toothed portion extending along a partial arc segment of the outer circumference of the ring gear. The one or more pawls are positioned adjacent the ring gear and movable between a retracted position and an engaged position in which the pawls engage an outer circumference of the ring gear. Each pawl is coupled with a solenoid configured such that activation of the solenoid moves the respective pawl to the retracted position and de-activation of the solenoid moves the pawls to the engaged position. The one or more pawls and the toothed portion of the ring gear are configured so that when the one or more pawls are in the engaged position and the ring gear is operably coupled with the torque tube supporting the photovoltaic panel, oscillating movement of the photovoltaic panel supported on the torque tube incrementally moves the solar panel toward a stowed position.

In various embodiments, the photovoltaic mounting system further includes a spur gear operably coupleable with the torque tube and a motor so that driving of the spur gear with the motor rotates the torque tube between the stowed position and one or more solar tracking positions. In some embodiments, the ring gear is attached directly to the spur gear drive. Typically, a pair of pawls are disposed adjacent the ring gear in opposite orientations so that one pawl inhibits rotation of the ring gear in a first direction when engaging the toothed portion while the other pawl of the pair inhibits rotation of the ring gear in an opposite direction when engaging the toothed portion. Each of the pair of pawls can be attached to a separate solenoid or can be attached to a common solenoid.

In various embodiments, the toothed portion along the partial arc segment of the ring gear is defined so that when the one or more pawls is engaged against an outermost tooth of the partial arc segment, the photovoltaic panel is oriented in the stowed position. When the pair of pawls are engaged against the outermost teeth at respective ends of the partial arc segment, the photovoltaic panel is oriented in the stowed position and remains secured within the stowed position by the pair of pawls until they are reenergized.

In various embodiments, the mounting system includes a spur gear drive adapted for use with a motor that is back-driveable. In various other embodiments, the system includes a spur gear that is disengageable from the motor to facilitate ratcheting movement of the photovoltaic panel with the ring gear. The spur gear can be disengageable via a solenoid configured so that when energized or activated, the spur gear is drivingly engaged with the motor and when de-energized, the spur gear is disengaged from the motor.

In various embodiments, the mounting system includes a ring gear with a toothed portion in a partial arc segment defined so that when the one or more pawls is engaged with a tooth nearest a middle of the partial arc segment, the photovoltaic panel is oriented in an inclined position relative the stowed position. Typically, the partial arc segment of the ring gear along which the toothed portion extends is about 180 degrees or less. In some embodiments, the toothed portion includes between 10 and 40 teeth, such as between 20 and 40 teeth. Typically, the teeth of the toothed portion are defined in equally spaced increments.

In various embodiments, the solenoid attached to the pawls includes a cylinder formed of a ferrous metal, a plunger, a spring, and a coil disposed about the cylinder so that when energized the plunger is drawn into the cylinder thereby compressing the spring. Each of the pawls is pivotally coupled adjacent the ring gear and includes a proximal base portion pivotally coupled with a distal end of the plunger so that when the coil of the solenoid is energized and the plunger is drawn into the cylinder of the solenoid, each pawl is pivoted so that a distal finger is spaced away from and disengaged from the ring gear.

In various embodiments, the mounting and tracking system includes a spur gear drive operably coupled with a torque tube for supporting and pivoting a photovoltaic panel by motor-driven rotation of the torque tube for solar tracking, a partially toothed ring gear securely coupled with the spur gear concentric with the torque tube and having a toothed portion extending along a partial arc segment of the ring gear. Each of the pair of pawls is disposed adjacent the ring gear and is movable between a refracted position and an engaged position in which the pawls engage an outer circumference of the ring gear. Each pawl is coupled with a solenoid configured so that activation of the solenoid pivots the respective pawl to the retracted position and de-activation of the solenoid pivots the pawls to the engaged position. In various embodiments, the pair of pawls and toothed portion of the ring gear are disposed in opposing orientations and positioned so that, when the pair of pawls are in the engaged position, oscillating movement of the photovoltaic panel supported on the torque tube incrementally moves the solar panel toward a stowed position.

In various embodiments, the photovoltaic mounting system includes a spur gear coupleable with a torque tube supporting a solar panel and adapted to pivot the solar panel by motor-driven rotation of the torque tube for solar tracking, a partially toothed ring gear securely coupled with the spur gear and having a toothed portion extending along a partial segment of the outer circumference of the ring gear, and a pair of pawls disposed adjacent the ring gear. The pawls are pivotally coupled so as to be movable upon de-activation of an attached solenoid between a refracted position that allow normal motor-driven movement of the panels and an engaged position in which the pawls engage an outer circumference of the ring gear to facilitate ratcheting stow movement. The pair of pawls and toothed portion of the ring gear are disposed in opposing orientations and position so that, when the pair of pawls are in the engaged position, oscillating movement of the solar panel supported on the torque tube incrementally moves the solar panel toward a stowed position without requiring use of electrical power.

DETAILED DESCRIPTION OF THE INVENTION

The present invention seeks to ameliorate some if not all of the shortcomings of the prior art with a solar tracking system that includes a ratcheting stow mechanism that allows for non-electrically powered movement of the panels toward a stowed configuration. In various embodiments, such systems can include a partially toothed ring gear with a pair of pawls pivotally mounted adjacent the ring gear with a pair of solenoids. When the solenoids are de-energized, the pawls move into engagement with the ring gear such that ratcheting movement of the pair of pawls along the ring gear in response to back-and-forth oscillating movement of the panel incrementally moves the panels into a stowed configuration without requiring use of electrical power.

Figure 1A:
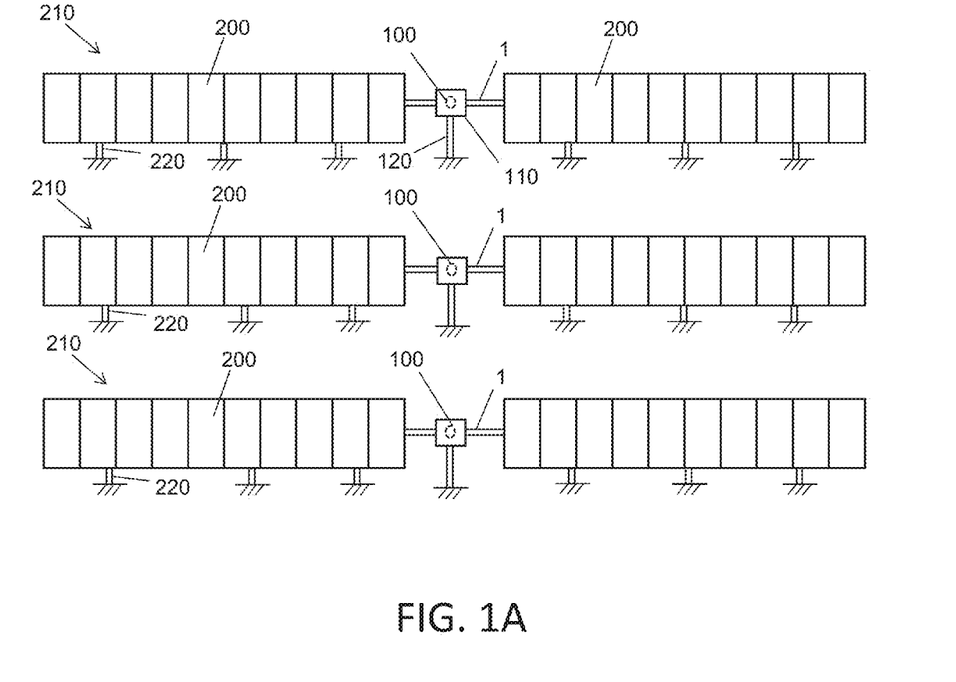
FIG. 1A illustrates a solar tracker array with a self-stowing system in accordance with various exemplary embodiments of the invention.
Figure 2A:
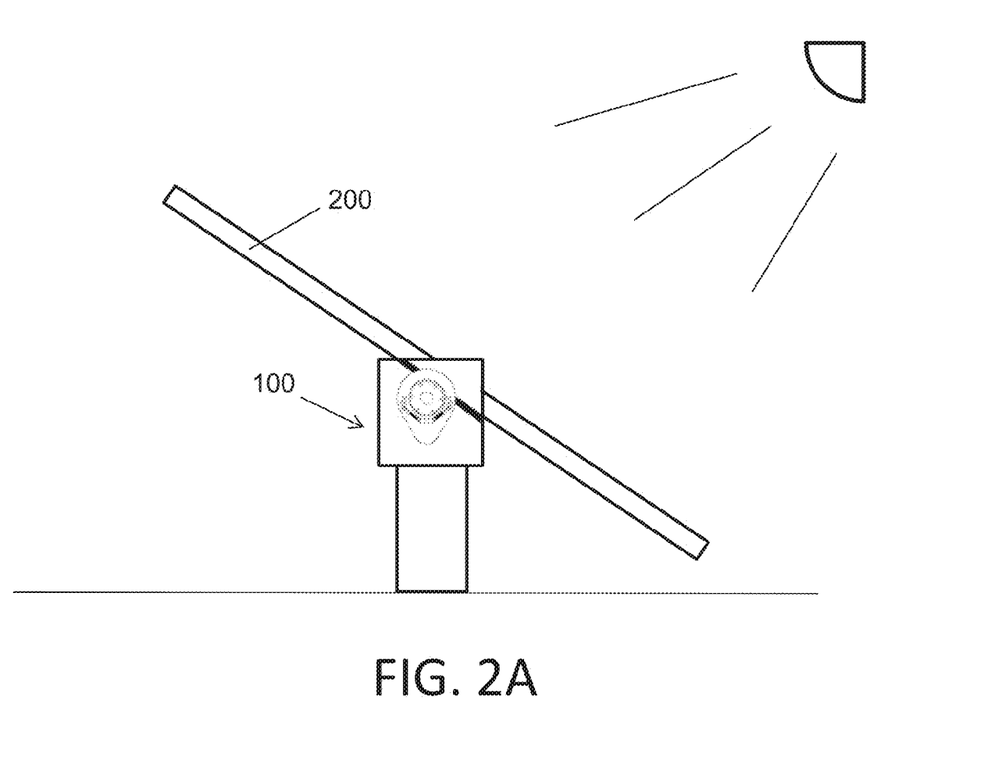
FIGS. 2A and 2B illustrates an upwardly pitched angled position for maximizing sun exposure and a more flattened stow position for reducing wind resistance, respectively.

Sun tracking mechanisms or trackers that move a solar panel into various upwardly tilted or inclined position, for example as shown in FIG. 2A, are particularly useful for maximizing sun exposure of the solar panel. Typically in a solar tracker, the axis of the torque tube is oriented North-South while rotation of the tube orients the orthogonally mounted panels through an arc ranging from East to West, as shown for example, in the solar tracker array in FIG. 1A. This sun tracking movement can be performed by controlled rotation of a torque tube supporting the solar panel according to the time of day or in response to a solar sensor.

Because of their size and remote location, solar trackers are vulnerable to damage from high winds. During windstorms, solar trackers are subjected to high stresses due to repeated oscillations and back-and-forth twisting of the torque tube. The twisting forces on the torque tube are near zero where held, while the maximum twist occurs at the point furthest from supports. The traditional method for holding the position of such panels is use of a non-back-driveable slew drive. This approach is expensive and typically requires larger, heavier and more costly components that are capable of withstanding such forces.

Figure 2B:
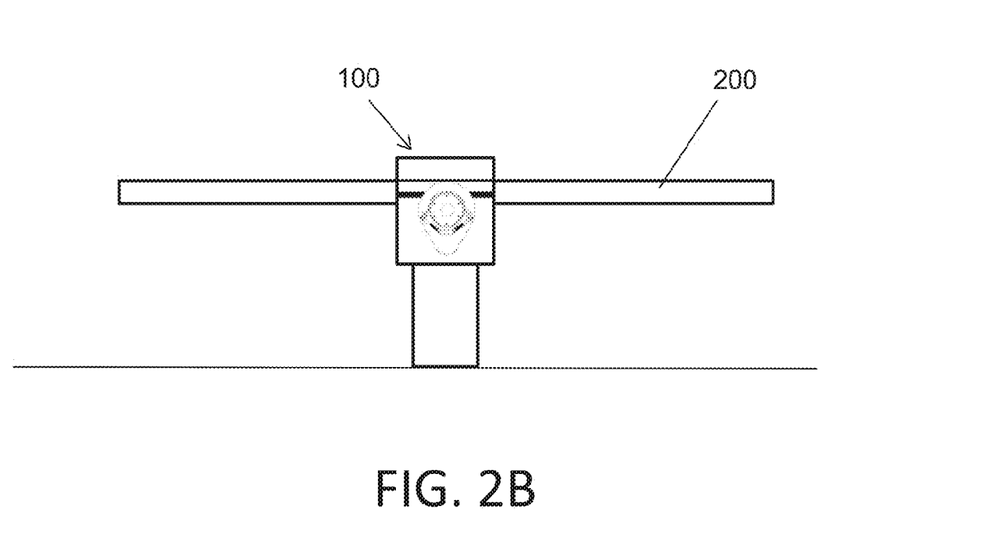

In addition, when motor/controller power is lost, sun tracking photovoltaic panels may be left in a bad orientation, for example in an inclined position, that further increases these oscillating type movements and associated stresses. Therefore, it is desirable to move the solar panels into a stowed position (e.g. flat or more flat), such as shown in FIG. 2B, to minimize the area of the wind cross section of the solar panels. However, stowing a row of panels can be challenging when relying on a backup source or manual intervention. The invention provides a ratcheting mechanism that provides for ratcheting movement in response to back-and-forth movement of the solar panel that moves the solar panel to the stowed position and maintains the solar panel in the solar position without requiring use of electrical power.

The attached figures illustrate at least several mounting and tracking systems useable with photovoltaic systems adapted for solar tracking, however, these illustrated embodiments are exemplary only. It should be appreciated that the broader concept of a non-electrically powered ratcheting mechanisms for incrementally moving photovoltaic panels can take many different forms beyond those shown here and may be usable with many different roof-top photovoltaic mounting systems without departing from the spirit or scope of the invention.

Referring now to FIGS. 1A-7, these figures illustrate various view of an exemplary ratcheting stow mechanism incorporated into a mounting and tracking system for use with solar tracking photovoltaic panels.

FIG. 1A shows a single-axis tracker installation according to various embodiments of the invention. Installation consists of three rows of tracker arrays 210. Each row consists of a torque tube 1, a series of support piles 210 and a number of photovoltaic modules 200, which are mechanically coupled to the respective torque tubes.

Individual tracker arrays 210 also include a motor for driving torque tube 1 and a self-stowing system 100 within tracker motor housing 110, which is mounted on a motor support pile 120. In the example of FIG. 1A, tracker motor housings 110 are located in the middle of each tracker array, however, it should be appreciated that in various embodiments, the motor can be located at either end or at another location between the middle and each end.

Figure 1B:
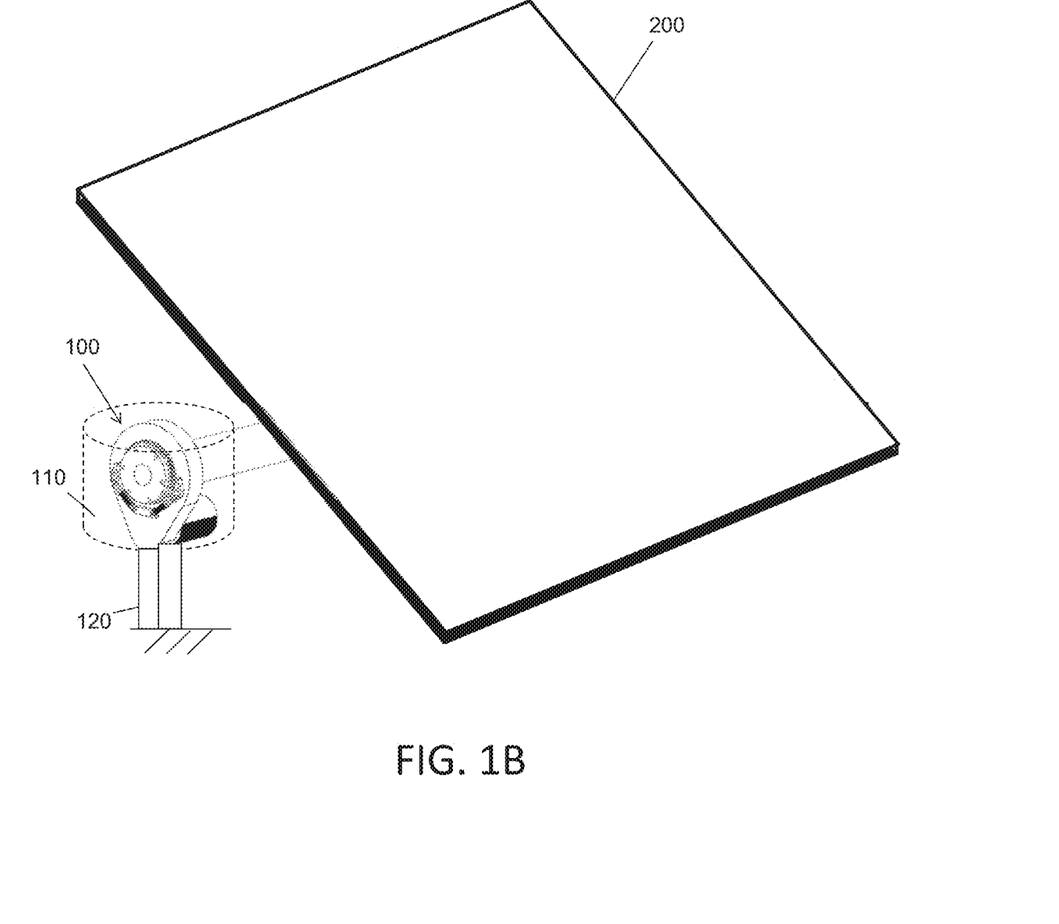
FIG. 1B illustrates a portion of a self-stowing system for a solar tracker with a ratcheting stow mechanism in accordance with various exemplary embodiments of the invention.

FIG. 1B shows an overview of exemplary mounting and tracking system 100 having a ratcheting stow mechanism for use with a photovoltaic panel 200. Typically, the powered drive assembly with ratcheting stow mechanism is included in an outer housing (shown in dashed) to protect the assembly from the elements. System 100 facilitates powered sun tracking movement of photovoltaic panel 200 between various inclined positions, such as that shown in FIG. 2A, as well as non-powered ratcheting movement towards a stowed position, such as that shown in FIG. 2B. While the stowed position here is shown as being substantially flat against the roof surface, which may be horizontal or inclined, it is appreciated that the stow position could be in various other positions, including positions that are relatively close to the roof surface to reduce wind resistance but that have a slight incline.

Figure 3:
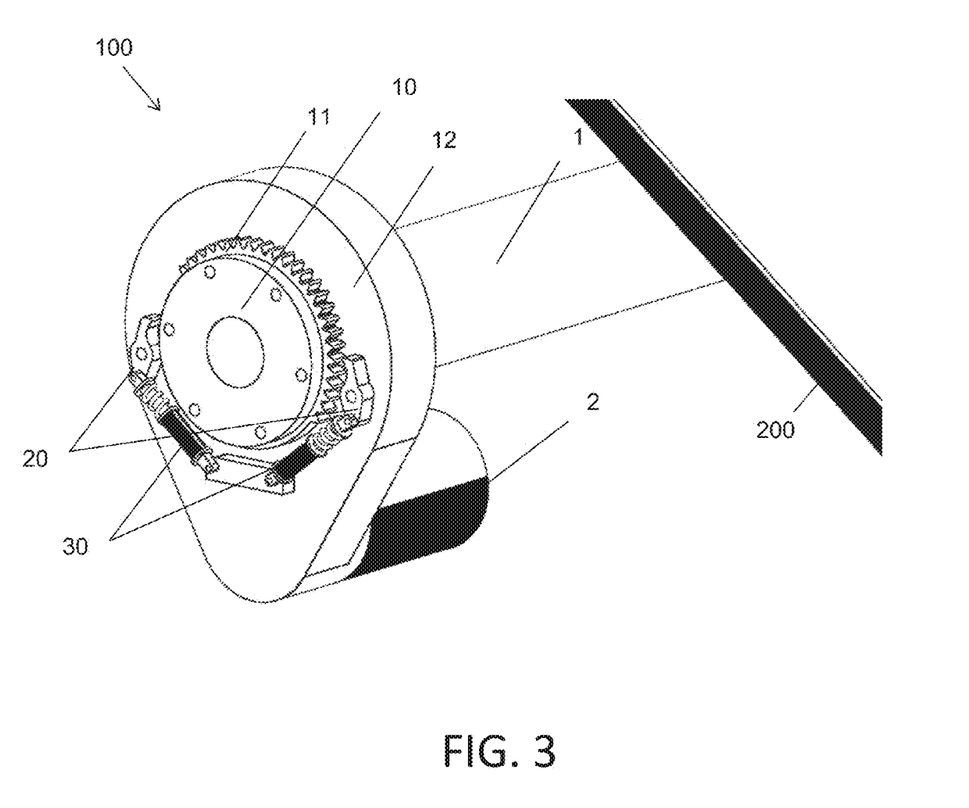
FIG. 3 illustrates a detailed view of the ratcheting stow system for a solar tracker in accordance with various exemplary embodiments.

FIG. 3 shows a detail view of ratcheting self-stowing tracking system 100. System 100 includes torque tube 1 adapted for supporting photovoltaic panel 200 and pivoting panel 200 between various inclined positions for solar tracking. This movement is effected by use of motor 2 coupled with spur gear drive 12 securely coupled with torque tube 1. Typically, spur gear drive 12 includes a spur gear (not shown) having involuted teeth either straight or helically cut on a cylindrical surface that interleave with corresponding teeth of a gear coupled to torque tube 1 so that motor driven rotation of the spur gear transmits rotational movement to the gear of the torque tube, thereby rotating the torque tube and pivoting the photovoltaic panel with a desired movement. While this embodiment utilizes a spur gear drive, it is appreciated that various other driving mechanisms may be used to effect sun tracking movement of the photovoltaic panel without departing from the spirit of the invention.

System 100 further includes a ratcheting mechanism operable to pivot photovoltaic panel 200 to a stowed configuration without use of electrical power. The mechanism includes partially toothed ring gear 10 attached to spur gear drive 12. Ring gear 10 includes toothed portion 11 along a partial arc segment of the outer edge of ring gear 10. The mechanism also includes pawls 20 pivotally attached to spur gear drive 12 so as to be movable between an engaged position in which the pawls engage the teeth of toothed portion 11 and a retracted position in which the pawls are spaced away from and disengaged from toothed portion 11 of ring gear 10.

Each of pawls 20 is angled or oriented so as to allow rotational movement of the torque tube in only one direction, when in the engaged position, so that as the solar panel rocks back-and-forth during a windstorm, the solar panel moves increment by increment to the stowed position and is held in the stowed position by pawls 20. As shown, pawls 20 are disposed on opposite sides of ring gear 10 and oriented in opposing positions. Thus, in combination, pawls 20 allow movement of the photovoltaic panel 200 towards the stowed configuration and inhibit movement of photovoltaic panel 200 away from the stowed configuration. Movement of pawls 20 between the engaged and retracted position is effected by solenoids 30 attached to each of pawls 20 and spur gear drive 12. Solenoids 30 are attached such that when energized, the pawls are pivoted away from ring gear 10 and when de-energized (e.g. when power is lost), the pawls are pivoted towards ring gear 10 to engage toothed portion 11. It is appreciated that while this embodiment utilizes a pair of pawls, that some embodiments may utilize only a single pawl, for example when the stowed position is at one end of a range of allowed movement. It is further appreciated that although this embodiment utilizes a solenoid for each pawl, some embodiments can include multiple pawls actuated by a common solenoid.

Figures 4A, 4B:
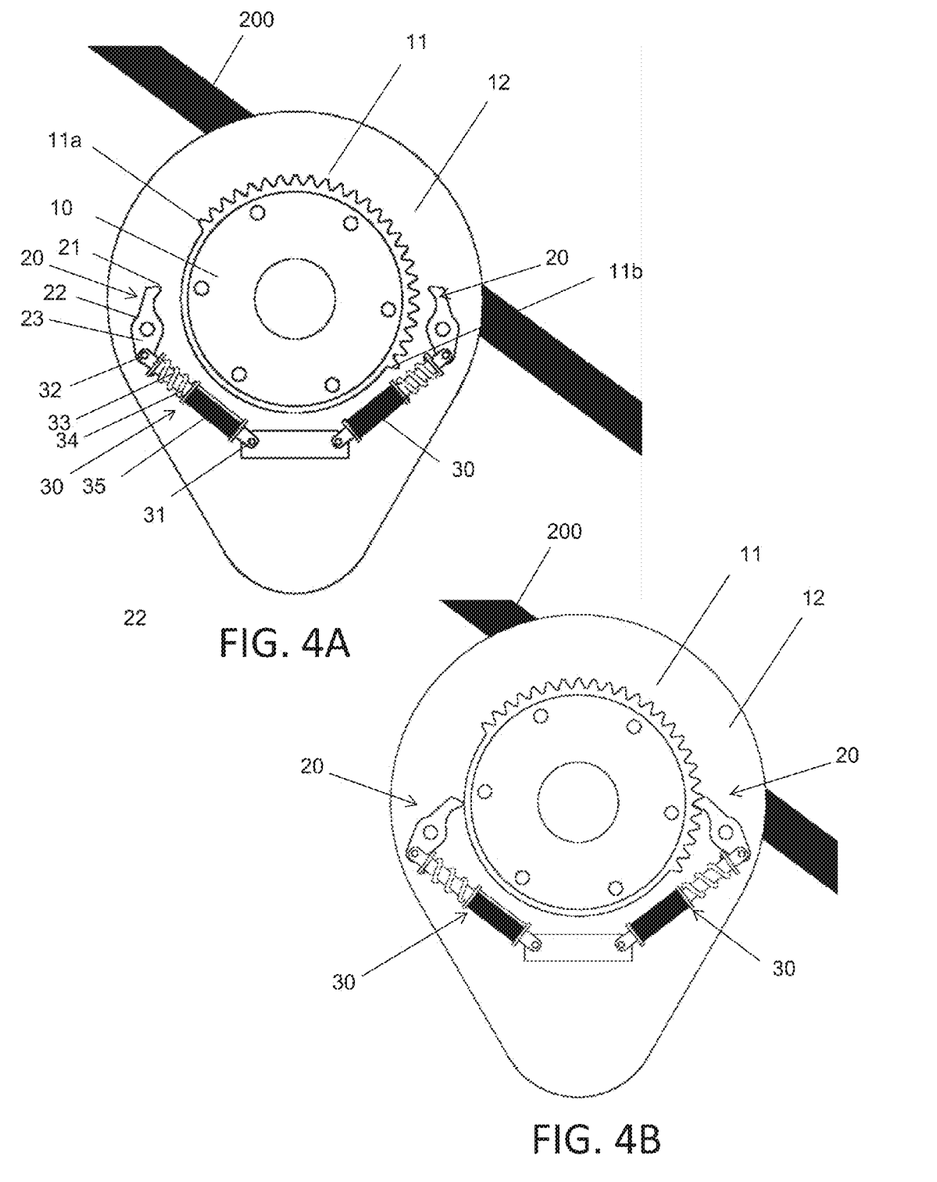
FIG. 4A illustrates a detail view of the ratcheting stow mechanism before deployment of the pawls to allow powered solar tracking movement of the photovoltaic panels in accordance with various exemplary embodiments.
FIG. 4B illustrates a detail view of the ratcheting stow mechanism after deployment of the pawls to facilitate non-electrically powered ratcheting movement of the photovoltaic panels to the stowed configuration in accordance with various exemplary embodiments.

FIG. 4A illustrates the ratcheting mechanism of system 100 during normal powered operation and FIG. 4B illustrates the ratcheting mechanism of system 100 during ratcheting stow operation without power. In FIG. 4A, system 100 is powered such that movement of the photovoltaic panel 200 between various solar tracking positions can be effected by powered movement of spur gear drive 12. During powered solar tracking movement effected by motor driven rotation of spur gear drive 12, solenoids 30 are energized and configured to pivot pawls 20 away from ring gear 10, as shown in FIG. 4A. This position allows spur gear drive 12 to rotate torque tube in either direction without contacting pawls 20 to move photovoltaic panel 200 into a desired position. Typically, during normal operation, motor 2 drives spur gear drive 12 according to the time of day and/or photo sensors so that photovoltaic panel 200 is rotated in order to maximize exposure to the sun throughout the day.

In this embodiment, each solenoid 30 is attached to spur gear drive 12 at a proximal end 31 and attached to base portion 23 of pawl 20 at distal end 32 such that when the solenoid is energized, base portion 23 of pawl 20 is pulled towards solenoid 30 thereby pivoting the distal finger 21 of pawl 20 away from engagement with ring gear 10. Each solenoid 30 includes plunger 33 movable within cylinder 35, and a coil (not shown) disposed about the cylinder such that when the coil is energized, the plunger is drawn into the cylinder thereby axially compressing spring 34 and providing the contracted position of the solenoid. Spring 34 is disposed so as to engage a distal portion of plunger 33 and bias plunger 33 in an extended position so that when solenoid 30 is de-energized, spring 34 causes the solenoid to return to its natural position thereby engaging base portion 23 of pawl 20 and pivoting pawl so that distal finger 21 of pawl 20 engages ring gear 10, as depicted in FIG. 4B. As shown, since photovoltaic panel 200 was oriented in an upwardly tilted configuration facing towards the right, left pawl 20 engages only a smooth portion of ring gear 10 while right pawl 20 engages the toothed portion 11 of ring gear 10. Right pawl 20 is oriented to allow motion of ring gear only in the counter-clockwise direction. As a result, twisting forces on the torque tube will result in a counter clockwise ratcheting motion that incrementally moves photovoltaic panel 200 into the stowed configuration and subsequently maintains the stowed configuration until power is restored and powered movement can be resumed.

Figure 5A:
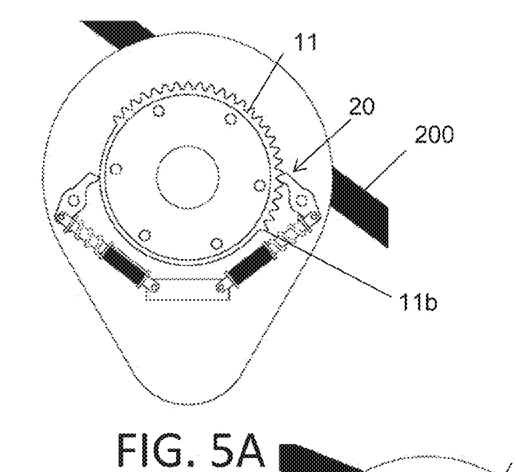
FIGS. 5A-5C illustrate sequential views of a ratcheting stow mechanism during ratcheting movement from a sun tracking position toward a stowed position in accordance with various exemplary embodiments.
Figure 5B:
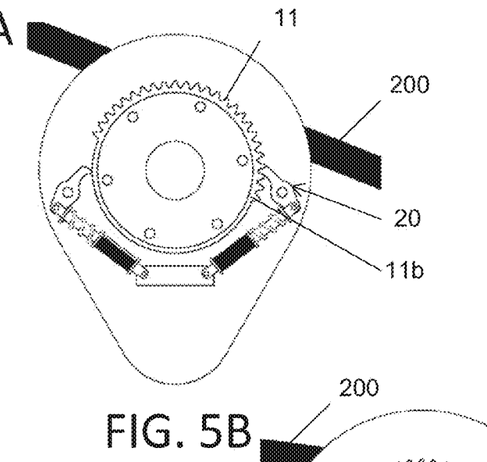
Figure 5C:
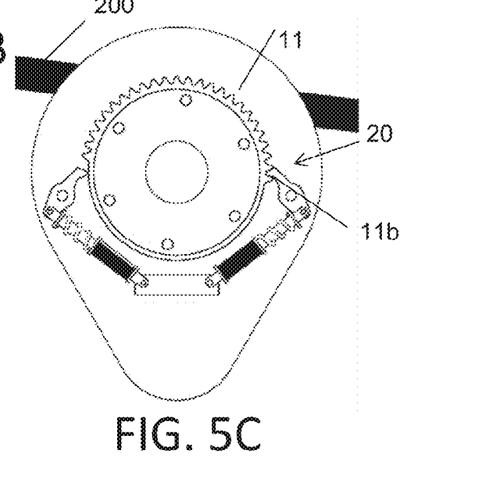

FIGS. 5A-5C illustrate this incremental movement of photovoltaic panel 200 from the upwardly oriented configuration shown in FIG. 5A to a stowed configuration. FIG. 5A shows the ratcheting mechanism in an initial position corresponding to that shown in FIG. 4B, both pawls 20 being engaged after power is lost, right pawl 20 being engaged with toothed portion 11. As the turbulent air flow rocks panel 200 back and forth, right pawl 20 inhibits clockwise rotation of ring gear 10 by its angled position secured by solenoid 30 in the extended position, but allows counter-clockwise rotation as distal finger 21 of pawl 20 tracks over one or more teeth towards an outer most tooth 11b along the right side of toothed portion 11, as shown in FIG. 5B. As this incremental movement continues, panel 200 progresses toward the stowed configuration, as shown in FIG. 5C, until panel 200 finally arrives at the stowed configuration, as shown in FIG. 6.

Figure 6:
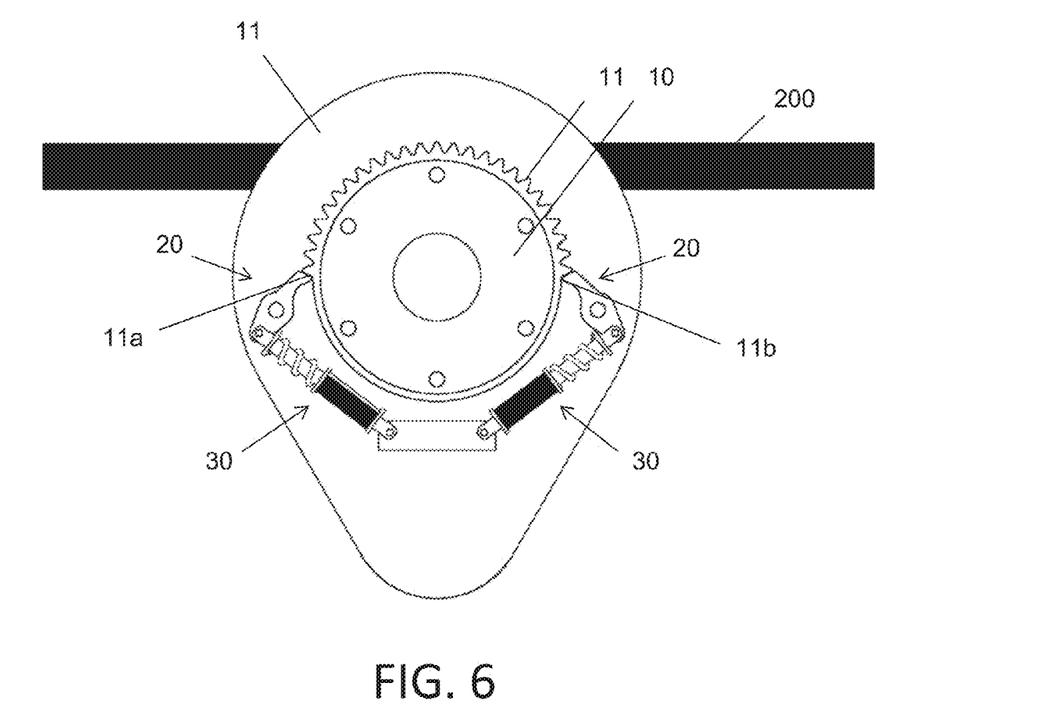
FIG. 6 illustrates a detail view of the ratcheting stow mechanism with the photovoltaic panel secured in the stowed position in accordance with various exemplary embodiments.

Once photovoltaic panel 200 is in the stowed configuration, engaged pawls 20 engage the outermost teeth 11a, 11b of toothed portion to secure panel 20 within the stowed configuration until power is restored, as shown in FIG. 6. While right pawl 20 acts only to inhibit movement in the clockwise direction and allows movement in the counter-clockwise direction, once panel 200 is in the stowed configuration, further movement of panel 200 in the counter-clockwise direction is prevented by left pawl 20 which engages the outermost tooth 11a at the left side of toothed portion 10. Similarly, if panel 200 is sloped to the left, left pawl will ratchet along teeth 11 until the right pawl engaged the first tooth of ring gear 10. Thus, in combination, pawls 20 allow for ratcheting movement of panel 200 to the stowed configuration and maintain photovoltaic panel 200 in the stowed configuration until power can be restored. This configuration is advantageous as it allows panel 200 to be inclined in either direction (e.g. facing left or right) for motor driven solar tracking while pawls 20 allows panel 200 to be safely stowed and maintained in the stowed configuration in the event power is lost. It is appreciated that in some embodiments, a single pawl could be used, particularly if the range of movement of the panel during solar tracking was more limited (e.g. if the panel only inclined to the right).

In one aspect, the toothed portion is defined so that a back and forth rocking movement of panel 200 incrementally moves pawls 20 along the teeth of toothed portion 11. In this embodiment, the toothed portion extends along a partial arc segment that extends across about half of the outer edge of the ring gear. It is appreciated that this configuration corresponds to a stowed configuration that is substantially flat against the roof surface, such that if the stowed configuration desired were slightly angled (e.g. about 30%), then the toothed portion could be defined as less than half of the ring gear (e.g. about 40%).

In the embodiments shown, toothed portion 11 includes 25 teeth along which pawls 20 track as photovoltaic panel 200 moves incrementally towards the stowed configuration. This configuration allows pawls 20 to engage individual teeth with relatively minor pivoting rocking movement of panel 200 (e.g. less than 10 degrees, typically about 7 degrees). It is appreciated that the ratcheting stow movement described herein can be provided by ring gear having a toothed region with more or less than the 25 teeth shown. In some embodiments, ring gear 10 includes a toothed portion with between 10 and 40 teeth, more typically between 20 and 30 teeth. While in some embodiments, fewer teeth may allow the panel to be moved more quickly to the stowed configuration, such an embodiment also requires relatively larger oscillating movement of the panel to effect movement of pawls to each consecutive tooth. It is appreciated that the toothed portion may differ according to various attributes of the photovoltaic panels 200 being supported. Since the distance that the panel rocks back and forth is a product of various attributes of the photovoltaic panel (e.g. size, shape, weight), the toothed portion can be configured to correspond to the cyclical movement of a particular panel. For example, a photovoltaic panel having a high natural frequency tends to oscillate in relatively small steps, while a photovoltaic panel having a low natural frequency tends to oscillate in substantially larger steps. Thus, a ratcheting mechanism suited for use with a photovoltaic panel having a high natural frequency may include a toothed portion with a greater number of teeth (e.g. between 20 teeth and 50 teeth), while a ratcheting mechanism suited for use with a photovoltaic panel having a low natural frequency may include a toothed portion with relatively fewer teeth (e.g. between 10 and 30 teeth). In some embodiments, it is advantageous to provide a ratcheting mechanism having a toothed portion suitable for use with either photovoltaic panels having a low or high natural frequency. Such a design is shown in FIG. 6.

In another aspect, the mounting system includes one or more position sensors that detect the position (e.g. orientation, upward inclination) of individual photovoltaic panels and relay positional information of the respective panels to the powered motor driven tracking system for the row of panels. Such systems can be configured such that each photovoltaic panel is independently operable from each other. Such a configuration is desirable as a row of multiple panels having mounting systems with a ratcheting stow mechanism can result in individual panels within the row being left in differing positions or inclinations. While generally if oscillatory movement of the panels continued for a sufficient time, all panels should be maintained in the stow configuration, it is possible that some panels may move more quickly than others into the stow configuration and that in the absence of continued wind, certain panels may be left in an inclined position. Thus, when power is restored, it is desirable to relay positional information as to the configuration of each of the respective panels (or at least information as to the positions of the panels relative each other), so that when powered motor driven movement of the panels resumes, the panels can be properly coordinated and controlled for effective solar tracking.

In various embodiments, the mounting and tracking system may include a backdriveable motor such that the ratcheting mechanism moves the motor driven assembly as well even though the motor is without power. Such a configuration may be useful as the position displacement of the motor can be determined when power is resumed without the need for additional positional sensors on the panel mounting assembly.

In various other embodiments, the mounting and tracking system may include a motor that is disengageable from the spur gear drive, thus preventing the need to back drive the motor and ensuring that the torque tube can be freely driven by the ratcheting stow mechanism. The motor can be disengaged by a similar pawl and solenoid configuration as described herein, that operates in reverse—that is, when the solenoid is energized, the pawl engages that motor with the spar gear drive and when the solenoid is de-energized, the pawl disengages the spur gear drive from the motor.

It is appreciated that while the ring gear is shown as being attached to the spur gear drive, that the ratcheting mechanism and associated ring gear may be configured according to various other arrangements so long as ring gear remains operably coupleable with the mechanism by which the photovoltaic panel is moved. For example, in some embodiments, the torque tube could be operably coupled to a spur gear drive for motor drive operation at a first point, and operably coupled to a ratcheting stow mechanism at another point (e.g. at opposite ends, adjacent points).

In various embodiments, the mounting system can include actively and individually controlled solenoid and pawl configurations that keep loads low on the motor. In addition, a ball and ramp type brake or any other one double-up one way device can be used instead of or in addition to the pawl and gear configurations described herein. In some embodiments, a wind triggered device that mechanically forces the pawls into place when windy can be used. Such wind triggered device can be used with selective direction triggering.

In various other embodiments, the ratcheting stow mechanism may rely on various other non-electrically powered sources of energy. For example, while in the embodiments described, the pawl, solenoid and ring gear mechanism rely on the oscillating back-and-forth movement of the solar panel, the mechanism could be configured to rely on additional sources of energy, for example a wind-triggered device or wind powered assembly (e.g. turbine) or other non-electrical source of mechanical energy.

In various other embodiments, a mounting and tracking system for use with photovoltaic panels can be configured according with any the above mechanisms or according to any of the concepts described herein to provide a fully wind driven tracking system based on tracker oscillation without requiring use of electrically driven motors.

The embodiments of the present inventions should not be limited in scope by the embodiments described herein. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments disclosed herein and claimed below.

What is claimed is:

1. A self-stowing assembly for a solar tracking system comprising:
    a partially toothed ring gear coupled with a rotating torque tube supporting a photovoltaic panel having a planar solar energy receiving surface and for moving the photovoltaic panel for solar tracking of the planar solar energy receiving surface by motor-driven rotation of the torque tube, wherein the ring gear includes a toothed portion extending along a partial arc segment of the outer circumference of the ring gear; and
    one or more pawls disposed adjacent to the ring gear and switchable between a retracted position in which the one or more pawls are dis-engaged from the ring gear and an engaged position in which the one or more pawls are engaged with an outer circumference of the ring gear,
    each pawl of the one or more pawls being coupled with a solenoid configured such that activation of the solenoid moves the respective pawl to the retracted position and de-activation of the solenoid moves the pawls to the engaged position so that
    when the assembly is electrically powered, activation of the solenoid maintains the one or more pawls in the retracted position disengaged from the ring gear, and
    when the self-stowing assembly is without electrical power, the solenoid is de-activated and the one or more pawls are maintained in the engaged position so as to stow the photovoltaic panel, wherein the one or more pawls and the toothed portion of the ring gear are configured such that, when the one or more pawls are in the engaged position, oscillating movement of the torque tube incrementally moves the photovoltaic panel toward a stowed position in which the planar solar receiving surface is substantially parallel to the ground so as to minimize a wind cross section area of the photovoltaic panel.

2. The self-stowing assembly of claim 1 further comprising:
    a spur gear operably coupleable with each of the torque tube and a motor such that driving of the spur gear with the motor rotates the torque tube,
    wherein the ring gear is attached to the spur gear.

3. The self-stowing assembly of claim 1 wherein the one or more pawls comprises a pair of pawls disposed adjacent the ring gear and positioned in opposite orientations so that one pawl inhibits rotation of the ring gear in a first direction when engaging the toothed portion while the other pawl of the pair inhibits rotation of the ring gear in an opposite direction when engaging the toothed portion.

4. The self-stowing assembly of claim 3 wherein each pawl of the pair of pawls is attached to a separate solenoid such that the pair of pawls is attached with a pair of solenoids, respectively.

5. The self-stowing assembly of claim 3 wherein the pair of pawls are attached to a common solenoid.

6. The self-stowing assembly of claim 1 wherein the partial arc segment of the ring gear is defined such that when the one or more pawls are engaged against an outermost tooth of the partial arc segment, the photovoltaic panel is oriented in the stowed position.

7. The self-stowing assembly of claim 3 wherein the partial arc segment of the ring gear is defined such that when the pair of pawls are engaged against the outermost teeth at respective ends of the partial arc segment, the photovoltaic panel is oriented in the stowed position and secured at the stowed position by the pair of pawls.

8. The self-stowing assembly of claim 2 wherein the spur gear is backdriveable.

9. The self-stowing assembly of claim 2 wherein the spur gear is disengageable via the solenoid configured such that when energized, the spur gear is drivingly engaged with the motor and when de-energized, the spur gear is disengaged from the motor.

10. The self-stowing assembly of claim 1 wherein the partial arc segment of the ring gear is defined such that when the one or more pawls is engaged with a tooth nearest a middle of the partial arc segment, the photovoltaic panel is oriented in an inclined position relative to the stowed position.

11. The self-stowing assembly of claim 1 wherein the partial arc segment of the ring gear along which the toothed portion extends is about 180 degrees or less.

12. The self-stowing assembly of claim 11 wherein the teeth of the toothed portion are defined in equally spaced increments.

13. The self-stowing assembly of claim 1 wherein the solenoid comprises a cylinder formed of a ferrous metal, a plunger, a spring, and a coil disposed about the cylinder such that when energized the plunger is drawn into the cylinder thereby compressing the spring only when the solenoid is energized.

14. The self-stowing assembly of claim 13, wherein each of the one or more pawls is pivotally coupled and includes a distal finger engageable with the ring gear and a base portion pivotally coupled with a distal end of the plunger such that when the coil of the solenoid is energized, each pawl is pivoted so that the distal finger is spaced away from and disengaged from the ring gear.

15. A self-stowing system for a solar tracker comprising:
a spur gear coupled with a torque tube for supporting a photovoltaic panel having a planar solar energy receiving surface and for rotating the photovoltaic panel by motor-driven rotation of the torque tube for solar tracking of the solar energy receiving surface;
a partially toothed ring gear securely coupled with the spur gear concentric with at least part of the torque tube, the ring gear having a toothed portion extending along a partial arc segment of the ring gear; and
a pair of pawls disposed adjacent the ring gear and movable between a retracted position and an engaged position in which the pair of pawls engage one or more teeth of the ring gear,
each pawl of the pair of pawls being coupled with a solenoid configured such that activation of the solenoid pivots the respective pawl to the retracted position and de-activation of the solenoid pivots the respective pawl to the engaged position so that
when the self-stowing system is electrically powered, activation of the solenoid maintains the pair of pawls in the retracted position disengaged from the ring gear, and
when the self-stowing system is without electrical power, the solenoid is de-activated and the pair of pawls are maintained in the engaged position so as to stow the photovoltaic panel supported by the torque tube,
wherein the pair of pawls and the toothed portion of the ring gear are configured such that, when the pair of pawls are in the engaged position, oscillating movement of the torque tube incrementally moves the photovoltaic panel toward a stowed position in which the planar solar energy receiving surface has an inclination of about zero degrees relative the to ground.

16. The self-stowing system of claim 15, wherein the pair of pawls and toothed portion of the ring gear are disposed in opposing orientations and positioned such that, when the pair of pawls are in the engaged position, oscillating movement of the photovolatic panel supported on the torque tube incrementally moves the photovoltaic panel toward the stowed position and the photovoltaic panel is maintained in the stowed position by the pair of pawls until electrical power is restored.

17. The self-stowing system of claim 15 wherein the partial arc segment of the ring gear along which the toothed portion extends is about 180 degrees or less and includes between 10 and 40 teeth.

18. A self-stowing system for a solar tracker comprising:
a spur gear drive having a spur gear coupleable with a torque tube supporting a solar panel having a planar solar energy receiving surface and adapted to rotate the solar panel by motor-driven rotation of the torque tube for solar tracking of the planar solar energy receiving surface;
a partially toothed ring gear securely coupled with the spur gear, the ring gear having a toothed portion extending along a partial arc segment of the outer circumference of the ring gear; and
a pair of pawls disposed adjacent the ring gear and movable between a retracted position and an engaged position in which the pair of pawls engage the outer circumference of the ring gear, each pawl of the pair of pawls being coupled with a solenoid configured such that activation of the solenoid moves the respective pawl to the retracted position and de-activation of the solenoid moves the respective pawl to the engaged position,
when the self-stowing system is electrically powered, activation of the solenoid maintains the pair of pawls in the retracted position disengaged from the ring gear, and
when the self-stowing system is without electrical power, the solenoid is de-activated and the pair of pawls are maintained in the engaged position so as to stow the solar panel supported by the torque tube,
wherein the pair of pawls and toothed portion of the ring gear are disposed in opposing orientations and position such that, when the pair of pawls are in the engaged position, oscillating movement of the solar panel supported on the torque tube incrementally moves the solar panel toward a stowed position in which the planar solar energy receiving surface has an inclination of about zero degrees relative the to ground.

19. The self-stowing system of claim 18 wherein the partial arc segment of the ring gear along which the toothed portion extends is about 180 degrees or less.

20. The self-stowing system of claim 18 wherein the toothed portion includes between 20 and 30 teeth.

* * * * *